US008059283B2

(12) United States Patent
Fukasawa et al.

(10) Patent No.: US 8,059,283 B2
(45) Date of Patent: Nov. 15, 2011

(54) RECORDING METHOD IN RECORDING APPARATUS, AND RECORDING APPARATUS

(75) Inventors: Jun Fukasawa, Hata-machi (JP); Yoshiyuki Kimoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 908 days.

(21) Appl. No.: 12/049,066

(22) Filed: Mar. 14, 2008

(65) Prior Publication Data

US 2008/0225314 A1 Sep. 18, 2008

(30) Foreign Application Priority Data

Mar. 14, 2007 (JP) ................................ 2007-065307

(51) Int. Cl.
*G06K 15/00* (2006.01)

(52) U.S. Cl. ...................................... 358/1.12; 358/1.14

(58) Field of Classification Search ................. 358/1.15, 358/400, 401, 500, 501, 444, 443, 448, 468, 358/1.18, 1.12, 1.14
See application file for complete search history.

(56) References Cited

U.S. PATENT DOCUMENTS 7,573,606 B2 * 8/2009 Nomoto et al. ................ 358/1.9
2006/0033795 A1 * 2/2006 Yokoi ........................... 347/104
2006/0221165 A1 * 10/2006 Kato ............................ 347/104
2007/0025780 A1 * 2/2007 Kurosu et al. ................. 399/313
2007/0046738 A1 * 3/2007 Yagi et al. ....................... 347/71
2007/0097165 A1 * 5/2007 Niioka ............................ 347/19

FOREIGN PATENT DOCUMENTS

JP 2001-232882 8/2001
JP 2003-326798 11/2003
JP 2006-212923 8/2006

* cited by examiner

*Primary Examiner* — Jerome Grant, II

(74) *Attorney, Agent, or Firm* — Maschoff Gilmore & Israelsen

(57) ABSTRACT

A recording apparatus includes a transporting unit which transports a recording medium and a recording unit which records data (e.g., prints) on the recording medium. A control unit controls the recording unit and the transporting unit. A detection unit detects a back end of the recording medium at a more upstream side of a transporting path than the recording position of the recording unit. A first judgment unit determines whether a scheduled recording is possible when the recording medium, while being transported, reaches a position where the recording should be performed when the detection unit detects the back end of the recording medium. A second judgment unit determines whether a portion of the scheduled recording to the recording medium is possible when the recording medium is transported to the position where the recording should be performed.

10 Claims, 9 Drawing Sheets

RECORDING METHOD IN RECORDING APPARATUS, AND RECORDING APPARATUS

BACKGROUND

1. Technical Field

The present invention relates to a recording apparatus and a recording method in a recording apparatus which can prevent an improper recording such as platen printing from occurring by judging whether a scheduled recording is possible at a position where transportation of a recording medium is stopped when detecting the back end of the recording medium which is being transported and by stopping performing the scheduled recording in the case in which the recording is impossible.

2. Related Art

Since the past years, as for a recording apparatus such as a serial printer, JP-A-2001-232882 (for example, paragraphs [0070] to [0077] and FIGS. 5 and 6) and JP-A-2006-212923 have disclosed the superposition control technique in which a paper feeding operation and a carriage operation are partially simultaneously performed in order to shorten the entire printing processing period. The superposition control technique conducts the paper feeding operation by driving a paper feeding motor (PF motor) after finishing printing processing of the amount of one pass. After that, a carriage motor (CR motor) is driven at a predetermined timing before the PF motor stops. By such an operation, it is possible to promptly start the printing operation at the same time when the paper feeding operation stops. Accordingly, this technique is advantageous in that it is possible to shorten the entire printing processing period over a technique in which the carriage operation is started by driving the CR motor after the stopping of the paper feeding operation.

For example, JP-A-2001-232882 discloses a recording apparatus which judges whether the back end of paper runs off a recording position of a recording head toward the downstream side in a paper transportation direction when paper feeding is stopped in the case in which the length of paper in the paper transportation direction (the paper transportation direction length) is shorter than a setup size, and which suspends the printing operation by issuing an order of printing refusal although the carriage is already driven in the case in which it is judged that the back end of the paper runs off the recording position. That is, the remaining amount of override area (printable range) is acquired on the basis of a counting value of an override counter which is driven after the back end of the paper passes a paper detection sensor and the remaining amount of paper feeding by a PF motor is also acquired. Thus, in the case in which it is judged that the remaining amount of paper feeding is the same or larger than the remaining amount of the override area, the printing refusal command is issued. Accordingly, in the case in which the back end of the paper has passed the recording position of the recording head, the printing operation is suspended by the printing refusal command and thus it is possible to prevent platen printing from occurring without wasting printing processing time.

However, a recording head is typically provided with a plurality of nozzles arranged in the paper transportation direction, and although JP-A-2001-232882 discloses that it is possible to prevent the platen printing from occurring, it likely happens that a printing is given to the platen as well as to the paper when movement of the nozzles (nozzle row) of the recording head is interrupted by the paper in the paper position after the stopping of the paper feeding. In this case, in spite of having been printable in the paper, there is a problem that the printing will be stopped. In the case in which a desired portion of an image cannot be printed in the paper because the paper is short, the printing may be terminated after some portion of the image is partially printed. In such a case, it is desirable that a printable part of the image is printed. For example, even if a marginal printing is set up, it is desirable that a printable range of the image is printed on the paper, losing the margin of the paper.

SUMMARY

An advantage of some aspects of the invention is that it provides a recording apparatus which can record some portion of recording data if the recording data is partially recordable among a scheduled record even if a transportation direction length of a recording medium is shorter than a setup size and it is judged that the scheduled record cannot be continued on the recording medium which is transported to a position where the next record should be performed when a detection unit detects the back end of the recording medium.

According to one aspect of the invention, there is provided a recording apparatus including a transporting unit which transports a recording medium, a recording unit which performs a recording on the recording medium, a control unit which controls the recording unit on the basis of recording data and the transporting unit so as to transport the recording medium, a detection unit which detects a back end of the recording medium at a more upstream side of a transporting path than a recording position of the recording unit, and a first judgment unit which judges when the back end of the recording medium is detected by the detection unit during transportation of the recording medium whether a scheduled recording based on the recording data by the recording unit is performable on the recording medium when the recording medium is transported to a position where the next recording should be performed. If the first judgment unit judges that the recording is possible, the control unit makes the recording unit perform the scheduled recording. If the first judgment unit judges that the recording is impossible, the control unit performs a first control in which the transportation is continued but the scheduled recording is suspended. In the case of suspending the recording, the recording apparatus further includes a second judgment unit which judges whether a partial recording of the recording data is performable on the recording medium which is transported to a position where the next recording should be performed, and the control unit controls the recording unit to record the recordable part of the recording data on the recording medium which is transported to a position where the next recording should be performed when the second judgment unit judges that some portion of the recording data is recordable. The recording apparatus is not limited to a structure in which the scheduled recording based on the recording data may be directly checked by viewing the contents of the recording data but may adopts a structure in which the scheduled recording is indirectly checked by judging whether a recording of the maximum recording range that can be recordable is possible.

With such a structure, when the detection unit detects the back end of the recording medium during the transportation of the recording medium, the first judgment unit judges whether a scheduled recording based on the recording data can be performed by the recording unit on the recording medium when the recording medium is transported to a position where the next recording should be performed. The control unit makes the recording unit perform the scheduled recording if the first judgment unit judges that the recording is possible. However, if the first judgment unit judges that the recording is impossible, the control unit continues the transportation of the recording medium but suspends the scheduled recording (first control). In the first control, in the case in which the scheduled recording is suspended, the second judgment unit judges where the scheduled recording is partially performable on the recording medium when the recording medium is transported to a position where the next recording should be performed. If the second judgment unit judges that some portion of the recording is possible, the control unit makes the recording unit perform a recording of a recordable part of the recording data on the recording medium which is transported to a position where the next recording should be performed (second control). Accordingly, when the transportation direction length of the recording medium is shorter than a setup, and the detection unit detects the back end of the recording medium, even if the scheduled recording cannot be continued on the recording medium when the recording medium is transported to the position where the next recording should be performed, some portion of the scheduled recording can be performed if the scheduled recording is partially performable.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
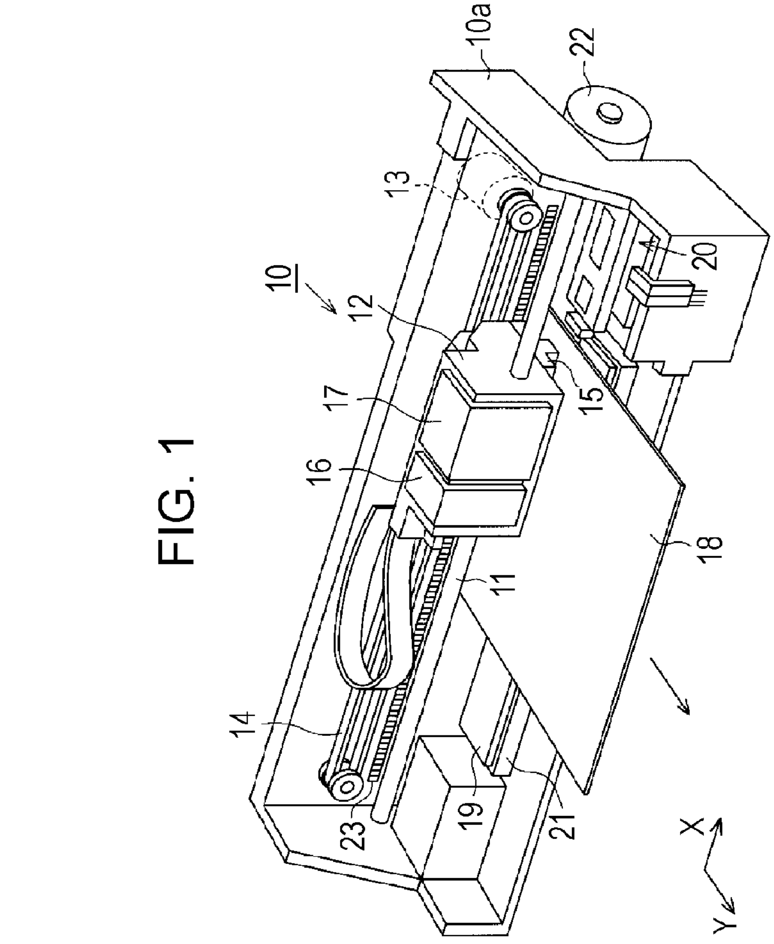
FIG. 1 is a perspective view illustrating a printer according to one embodiment of the invention.

Hereinafter, a printer as a recording apparatus according to one embodiment of the invention will be described with reference to FIGS. 1 to 11D. FIG. 1 is a perspective view of a printer. As shown in FIG. 1, a carriage 12 is provided to a guide shaft 11 disposed in a main case 10*a* of the printer 10 serving as a recording apparatus in a manner of reciprocating in a main scanning direction (direction of X in this figure). The carriage 12 will reciprocate in the main scanning direction X by an endless timing belt 14 when a carriage motor (hereinafter, referred to as CR motor 13) drives. A recording head 15 of an ink jet system is disposed in the lower part of the carriage 12 as a recording unit. Ink supplied to the recording head 15 from black and color ink cartridges 16 and 17 which are detachably mounted on the upper part of the carriage 12 is ejected from a plurality of nozzles provided to the undersurface of the recording head 15 for every ink color. In addition, according to this embodiment, a moving unit is constituted by the guide shaft 11, the carriage 12, and the timing belt 14.

Under the carriage 12, a planar type platen 19 which defines a distance (gap) between the recording head 15 and paper 18 is arranged. In FIG. 1, the right end position of a main scanning direction moving range of the carriage 12 is set as a home position. A maintenance device 20 which performs cleaning of the recording head 15 is installed at a position which is directly under the carriage 12 located in this home position. Moreover, a waste fluid tank 21 which contains waste ink discharged from the maintenance device 20 is arranged under the platen 19.

A paper feeding motor (hereinafter, referred to as PF motor 22) is arranged at the right end lower part of FIG. 1 in the main case 10*a*. The paper 18 is transported (paper feeding) in a subscanning direction Y after it is pinched by transportation rollers 24 (see FIG. 2) driven by the PF motor 22. Printing is carried on the paper 18 by alternately performing the printing operation (recording operation) which is performed by ejecting ink drops from the recording head 15 during the movement of the recording head 15 in the main scanning direction X of the carriage 12 and the paper feeding operation in the subscanning direction Y of the paper 18. Moreover, the printer 10 is provided with a linear encoder 23 arranged along the guide shaft 11. The linear encoder 23 outputs a number of pulses, which is proportional to the moving range of the carriage 12. The speed and position controls of the carriage 12 are performed on the basis of a movement zone, movement speed, and movement direction of the carriage 12, which are acquired using the output pulses.

Figure 2:
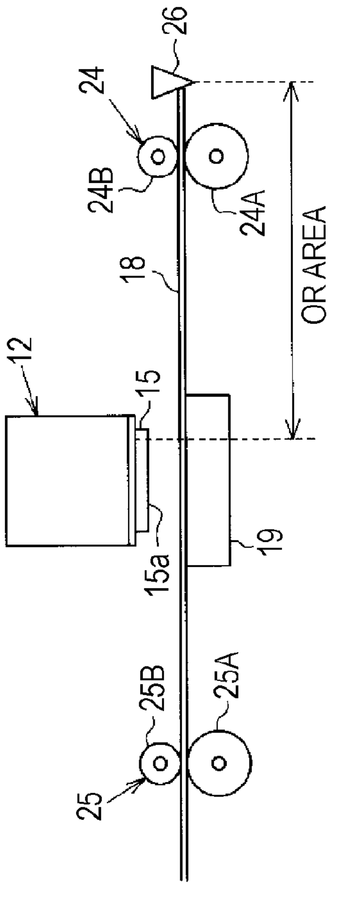
FIG. 2 is a schematic side view illustrating a recording head and a transporting mechanism.

FIG. 2 is a schematic side view showing the recording head and a transportation mechanism. As shown in FIG. 2, the transportation roller 24 (paper feeding roller) and paper discharge roller 25, which constitute a transporting unit, are rotatably disposed at positions which are at the upstream side and the downstream side of the recording position (or platen 19) of the recording head 15 on the transporting path of the paper 18, respectively. The transportation roller 24 and the discharge roller 25 consist of a pair a driving roller 24A and a driven roller 24B and a pair of a driving roller 25A and a driven roller 25B, respectively. The paper 18 is transported leftward (the subscanning direction Y) in FIG. 2 when the driving force of the PF motor 22 (see FIG. 1) is transmitted to the transportation roller 24 and both the driving rollers 24A and 25A rotate. In addition, the paper 18 is fed because a paper feed roller (not shown) which is installed at a more upstream side of the paper transportation direction than the transportation roller 24 is rotated by the driving force transmitted via a clutch unit (not shown) from the PF motor 22.

The paper detection sensor 26 is disposed at a slightly more upstream side than the transportation roller 24 in the paper transportation direction. The paper detection sensor 26 consists of a contact sensor (switch sensor) so that it is turned on when the front end of the paper 18 which is fed hits and displaces a detection lever thereof, and it is turned off when the back end of the paper 18 passes is and the detection lever returns to its original standby position by spring power. In addition, it is sufficient that the paper detection sensor 26 can detects the back end of the paper 18 so that the paper detection sensor 26 may consist of an optical sensor.

Figure 6:
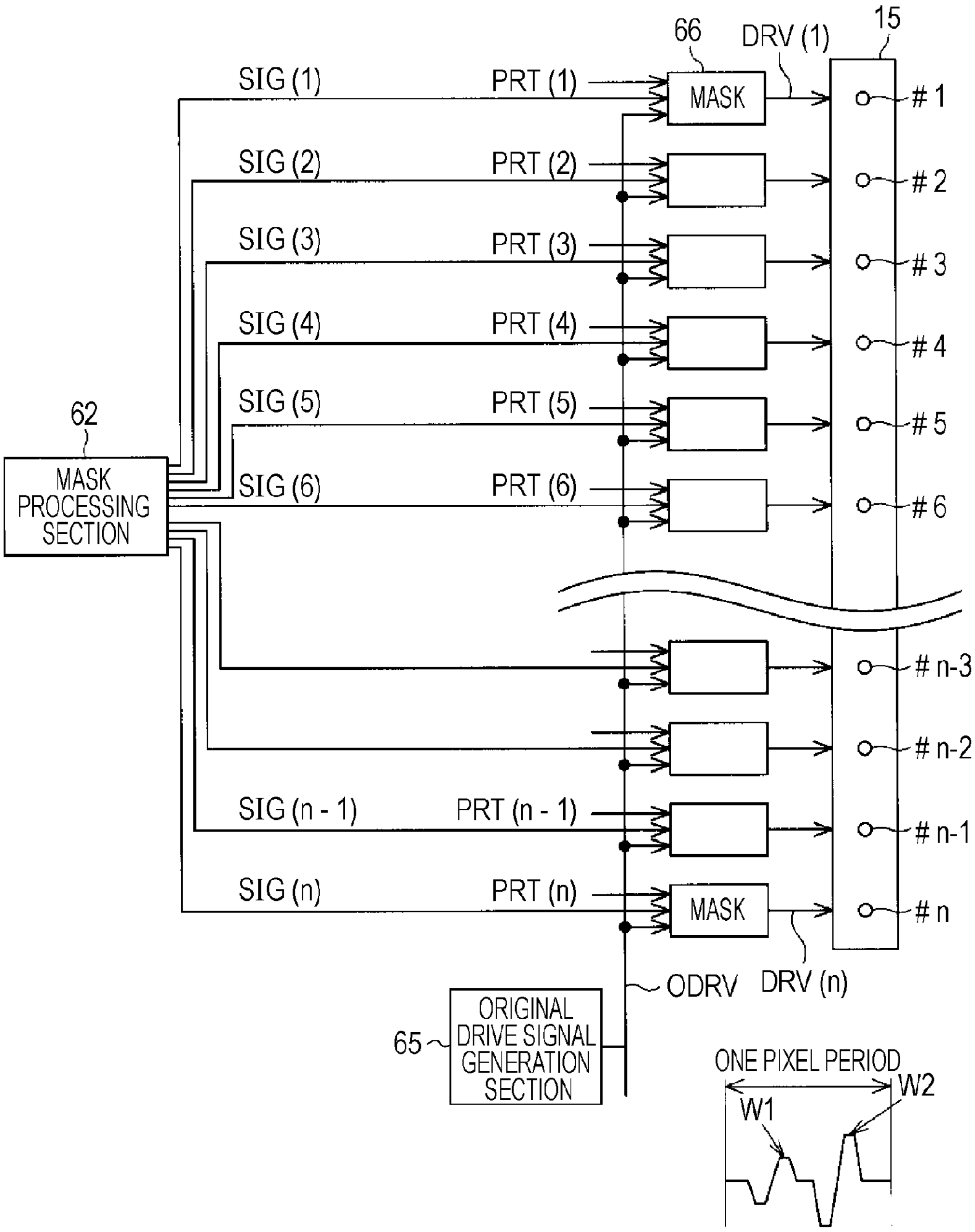
FIG. 6 is a block diagram illustrating a circuit of a head drive system.

After the paper detection sensor 26 falls into a detection state of "no paper" as the back end of the paper 18 passes the paper detection sensor 26, the override area OR is set up as a printable range in the transportation direction. The nozzle orifice surface 15*a* of the recording head 15 is provided with nozzles #1 to #n which are arranged in rows NZ (see FIG. 6)

in the straight line form or in the zigzag form in the subscanning direction Y. The number of nozzle rows NZ is the same as the number of ink colors (FIG. 6 illustrates only one nozzle row).

The override area OR shown in FIG. 2 is set up with this embodiment as a range from the position (detection position) of the paper detection sensor 26 to the location of the nozzle (the uppermost stream side nozzle) of the recording head 15 in the transportation direction. For example, when the paper 18 with the transportation direction length shorter than a setup (paper size setup of the printing conditions) is fed by mistake, it likely happens that the back end of the paper 18, which is detected by the paper detection sensor 26, is disposed at a more downstream side of the transportation direction than the override area after paper feeding is stopped. In this case, if the printing is performed after the paper feeding, since it likely happens that the printing is given to the platen 19 (ink drop ejection to the platen), with this embodiment, the printing is canceled and thus the platen printing prevention control, which prevents the printing is carried on the platen 19, is performed. The greater details of such a control will be mentioned later.

Figure 3:
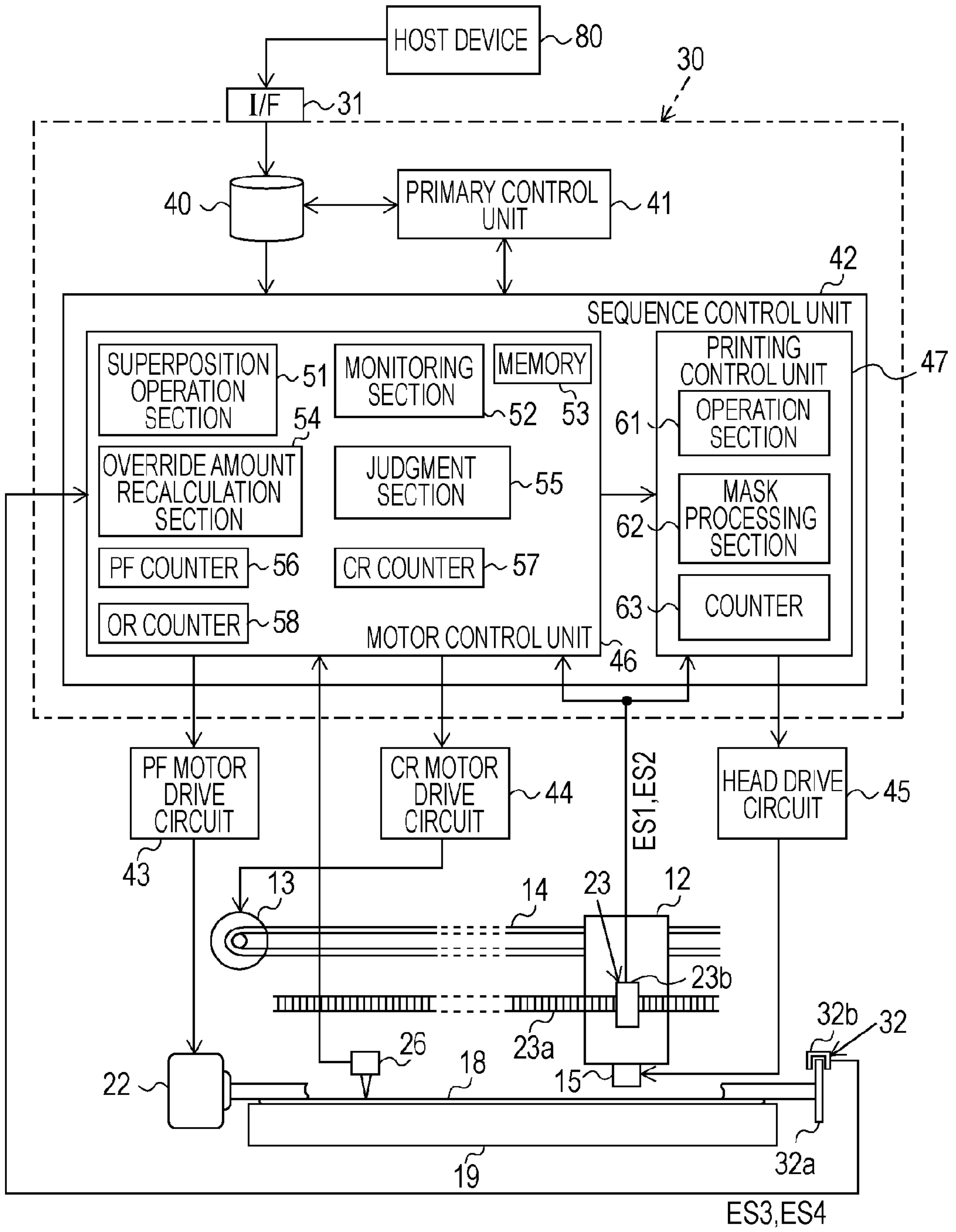
FIG. 3 is a block diagram illustrating an electrical configuration of the printer.

FIG. 3 is a schematic view showing the electrical structure of the printer 10. The printer 10 is equipped with a controller 30, an interface (hereinafter, referred to as I/P31), the CR motor 13, the PF motor 22, the linear encoder 23, the paper detection sensor 26, and a rotary encoder 32. The controller 30 receives printing data from the host devices 80 (for example, personal computer etc.) via the I/F 31.

The controller 30 performs exchange of various data (printing data etc.) with the host devices 80 (for example, personal computer etc.) via the I/F 31. The controller 30 receives the printing data transmitted from the host device 80.

The controller 30 is equipped with a buffer 40, the main control unit 41, the sequence control unit 42, a PF motor drive circuit 43, a CR motor drive circuit 44, and a head drive circuit 45. The main control unit 41 interprets commands in the printing data transmitted from the host device 80 via the I/F 31, and performs the various demands, which include a paper feeding demand and a printing demand, with respect to the sequence control unit 42 according to the commands. The main control unit 41 sends raster data (bit map data) other than the commands among the printing data to the sequence control unit 42 (specifically, to a printing control unit 47).

On the basis of the demands received from the main control unit 41, the sequence control unit 42 outputs drive signals to the PF motor drive circuit 43, the CR motor drive circuit 44, and the head drive circuit 45 in order of predetermined sequence, so that the feeding operation, the printing operation and the paper sending operation, and the paper discharge operation can be performed. The sequence control unit 42 is equipped with a motor control unit 46 and the printing control unit 47.

The motor control unit 46 sets up the starting and a travel schedule (drive schedule) of the CR motor 13 and the PF motor 22, and performs a motor drive control including a superposition control, etc. The printing control unit 47 sets up a printing schedule, and carries out a drive control of the recording head 15. Moreover, the printing control unit 47 performs various operation processing required in order to decide the ejection timing at which ink drops are ejected (or fired) from the recording head 15, processing of execution and stopping of the printing, and processing that determines a printing area which is a domain in which ejection of ink drops is allowed.

The motor control unit 46 is equipped with a superposition operation section 51, a monitoring section 52, a memory 53, an override amount recalculation section 54, a judgment section 55, a PF counter 56, a CR counter 57, and an override counter (hereinafter, referred to as OR counter 58). Moreover, the printing control unit 47 is equipped with an operation section 61, a mask processing section 62, and a counter 63.

The motor control unit 46 determines a moving direction of the carriage 12, when either one pulse of two pulse signals ES1 and ES2, which are inputted from the linear encoder 23 at the time of driving the carriage and which have a phase difference of 90 degrees, is in the rising edge, according to the level (high or low) of the other pulse of the two pulses ES1 and ES2. Moreover, the motor control unit 46 clocks the pulse cycle of pulse signals ES1 and ES2, and acquires the movement speed of the carriage 12 by the reciprocal of the pulse cycle.

The CR counter 57 counts edges of the pulse signals ES1 and ES2, increments the counting value when the carriage 12 moves in a direction of being apart from the home position (forward movement), and decrements the counting value when the carriage 12 moves in a direction of approaching the home position (backward movement). In such a manner, the CR counter 57 manages the movement zone of the carriage 12 which makes the home position the starting point.

Moreover, as shown in FIG. 3, the rotary encoder 32 includes a mark board **32*a* fixed to the end of a shaft (for example, a shaft of the transportation roller 24A) connected with the PF motor 22 in a manner of being able to transferring the power of the PF motor 22, and a sensor 32*b* which outputs two pulse signal ES3 and ES4 which have a phase difference of 90 degrees by receiving light which penetrated a slit of the mark board 32*a***.

The PF counter 56 consists of two counters. The first counter is reset when the paper detection sensor 26 detects the front end of the paper 18, and is reset again when the front end of the paper 18 arrives at the position of the uppermost stream side nozzle (the dashed line position in FIG. 2) by counting the distance equivalent to the OR area. After the re-reset operation, the first counter manages the transportation position of the paper 18 in a manner of setting the uppermost stream side nozzle location as the staring point by counting the pulse edges of the pulse signal ES3 and ES4. The second counter is reset when the PF motor 22 starts to drive and counts the paper feeding amount Spf from the paper feeding starting time to the present time by incrementing a counting value on the basis of the output pulses of the rotary encoder 32.

The override counter 58 sets up an initial override amount SORint which corresponds to the distance (the transportation direction length of the OR area in FIG. 2) from the position of the paper detection sensor 26 to a reference position at the time when the paper detection sensor 26 detects the back end of the paper 18. In addition, the override counter 58 counts the remaining amount (override amount) that it takes for the back end of the paper 18 to arrive at the transportation direction end position (reference position) of the override area OR by carrying out decrement processing based on the output pulse of the rotary encoder 32.

The motor control unit 46 performs the superposition control (CR-PF superposition control) which overlaps the carriage operation and the paper feeding operation in terms of time so that the printing operation of the recording head 15 may be started immediately after the paper feeding is stopped, and starts the CR motor 13 and the PF motor 22 and creates a traveling schedule in a manner such that the superposition control condition is fulfilled. When performing this superposition control, the carriage operation is started before the paper feeding operation is stopped. In the case in which the paper 18 whose paper transportation direction length is shorter than a setup size is fed, it likely happens that at least a part of the paper 18 is not present directly under the nozzles #1 to #n of the recording head 15, i.e. at the printing position when the carriage 12 arrives at a printing starting position and starts the printing operation. In this case, the platen 19 is printed if the printing operation is performed in such a state. Accordingly, in order to prevent the platen printing which leads to smudging of paper 18, it must be judged whether the paper 18 is in the printing target position, and a control (platen printing prevention control), which stops the printing operation if even a part of the paper is not present in the printing target position, is performed.

The superposition operation section 51 performs CR-PF superposition operation which calculates the starting time of the CR motor 13 when overlapping the paper feeding operation and the carriage drive operation by driving the CR motor 13 before the PF motor 22 stops.

Figure 4:
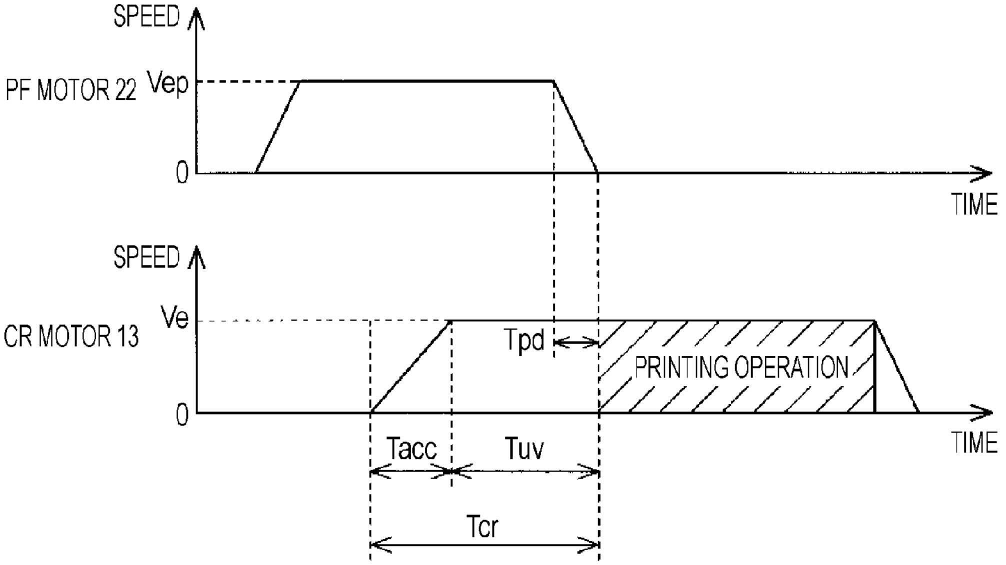
FIG. 4 is a graph for explaining superposition operation of a PF motor and a CR motor.

Here, the contents of the operation of the superposition operation section 51 will be explained in detail with reference to FIG. 4. FIG. 4 is a view schematically showing the speed waveform of the PF motor 22 and the speed waveform of the CR motor 13. In the graph of this figure, a horizontal axis shows time and the vertical axis shows speed. The superposition operation section 51 performs acceleration time measurement processing, distance operation processing, movement time operation processing, and paper feeding amount operation processing as superposition optimization operation processing. CR starting timing which optimizes overlapping period of the operations of the PF motor 22 and the CR motor 13 by this superposition optimization operation processing is acquired as a paper feeding amount STpf it takes to stop the paper feeding.

In the acceleration time measurement processing, acceleration time at the time of driving the CR motor 13 is measured on the basis of the output of the linear encoder 23 and the output of the speed operation section, and the measurement result is stored in the memory 53. The acceleration time is a period it takes to reach a constant speed traveling area after the CR motor 13 starts, that is, the time Tacc shown in FIG. 4. This acceleration time Tacc is used for the operation upon performing the next drive of the CR motor 13. Moreover, in the distance operation processing, the next printing starting position is acquired and the distance Lc between the present position (stop position) of the carriage 12 which is acquired from the CR counter 57 and the next printing starting position is calculated on the basis of the output of the linear encoder 23 and the printing information sent from the buffer 40 by the transmission control of the main control unit 41.

In the movement time operation processing, the movement time Tcr from the stop position of the carriage 12 to the printing starting position is calculated (see FIG. 4). This movement time Tcr is expressed by the following formula using the last acceleration time Tacc of the CR motor 13 stored in the memory 53 and the time Tuv it takes to reach the printing starting after the movement speed of the carriage 12 reaches the constant speed. $Tcr=Tacc+Tuv$ . . . (1). In addition, when supplying power and when the weight of the carriage 12 changes rapidly before and after cleaning, the acceleration time Tacc used in the above formula is the minimum of the acceleration time which is assumed.

On the other hand, the time Tuv used in the above-mentioned operation is expressed by the following formula using the distance Lt in which the carriage 12 travels during the acceleration time Tacc, and the distance Lc acquired by the above-mentioned distance operation processing. $Tuv=(Lc-Lt)/Ve$ . . . (2). The distance Lt in which the carriage 12 progresses during the above-mentioned acceleration time Tacc is expressed by the following formula. $Lt=Ve\cdot Tacc/2$ . . . (3). The movement time Tcr can be acquired from the above formulas (1), (2), and (3). In addition, a method of obtaining the acceleration time Tacc may be changed from a measurement method to a calculation method in which the acceleration time Tacc is calculated from the speed data stored in the memory 53 or a method of reading and using the calculation result which is stored in the memory 53 as data.

In the paper feeding amount operation processing, when it is assumed that a time, which takes until the PF motor 22 runs in a constant speed range and then stops, is the same as the movement time Tcr, the paper feeding amount STpf by the PF motor 22 is calculated during the above-mentioned time Tcr.

This paper feeding amount STpf is acquired as follows. The deceleration time Tpd of the PF motor 22, i.e., time which takes until the speed of the PF motor 22 decreased from the constant speed Vep to zero (the stopping of the PF motor), is a fixed value which is decided according to the above-mentioned predetermined constant speed Vep. If the paper feeding amount during a period in which the PF motor 22 runs a single unit of distance (for example, while the PF motor rotates one time) is defined as $\alpha$, the paper feeding amount STpf will be given by the following formula. $STpf=\alpha(Vep(Tcr-Tpd)+Vep\cdot Tpd/2)$ . . . (4). The motor control unit 46 controls the superposition operation section 51 to start to perform the above-mentioned operation in order to acquire the paper feeding amount STpf, when a next printing demand is received from the main control unit 41. Moreover, actual paper feeding amount Spf is acquired by the PF counter 56, and remaining paper feeding amount SRpf is acquired by subtracting the paper feeding amount Spf to the current time from the paper feeding amount SApf (the total paper feeding amount). Then the paper feeding amount STpf calculated by the superposition operation section 51 and the paper feeding remaining amount SRpf are compared with each other, and a CR drive signal which instructs to drive the CR motor 13 is outputted to the CR motor drive circuit 44 when the paper feeding remaining amount SRpf is not larger than the paper feeding amount STpf.

Moreover, the monitoring section 52 manages three states of the paper 18. The three states includes "paper presence state" in which the paper 18 is detected by the paper detection sensor 26, "override state" in which the back end of the paper 18 is in the override area OR which is a domain that can be printable by the recording head 15 after the back end of the paper 18 is detected by the paper detection sensor 26, and "no paper state" in which at least portion of recording data is not printable because the back end of the paper 18 is positioned at a more downstream side of the paper transportation direction than the override area OR. In the case in which the paper transportation direction length (for example, A5 size) of the paper 18 which is fed actually is shorter than the setting length (for example, A4 size), and in which the back end of the paper 18 has passed through the reference position (uppermost stream nozzle location) of the recording head 15 at the time that the paper feeding is stopped, the paper state falls into "no paper state."

In detail, the monitoring section 52 compares the initial override amount SORint and the paper feeding remaining amount SRpf upon detecting the back end of the paper, if the back end of the paper 18 is detected by the paper detection sensor 26 and the paper detection state changes from "paper presence state" to "no paper state." If the paper feeding remaining amount SRpf is larger than the initial override amount SORint (SRpf>SORint), it is judged that the paper state is "no paper state" in which the back end of the paper 18 runs off the override area and at least some portion of the paper 18 is not present in the recording position of the recording head 15 when the paper feeding is stopped. If the monitoring section 52 judges with "no paper state," the motor control unit 46 will send a printing cancellation demand to the printing control unit 47, cancel ejection (firing) of ink drops, and prevent printing from being performed to the platen 19.

If the printing cancellation demand from the motor control unit 46 is not transmitted, the printing control unit 47 will output a printing execution instruction to the head drive circuit 45, and will permit ejection (firing) of the ink drops from the recording head 15. On the other hand, if there is the printing cancellation demand, the printing control unit 47 does not output the printing execution instruction to the head drive circuit 45 and thus ejection of the ink drops from the recording head 15 will be suspended.

The counter 63 counts the movement length from a movement starting position (stop position) of the carriage 12 to the printing starting position. If the calculated value reaches the value corresponding to the printing starting position, the printing control part 47 will output the ink drop ejection instruction to the head drive circuit 45 at timing in which the ink drop ejection (firing) should be carried out.

When the paper 18 shorter than the setting length is set and the back end of this paper 18 is detected by the paper detection sensor 26, even if there is the printing cancellation as the monitoring section 52 judges the paper state as "no paper state", it likely happens that at least some portion of the paper 18 exist directly under nozzles #1 to #n of the recording head 15 in the paper position. In this case, although the printing to platen 19 can be avoided by the printing cancellation, some portion of the printing that is partially performable is also no longer performed due to the printing cancellation. Even when the paper 18 which is shorter than the setup is set, if an intended portion of an image is printed on the paper, the printing may be terminated without reprinting. In consideration of such a case, even when the printing cancellation is carried out for the platen printing prevention, with this embodiment, in the case in which some portion of the paper 18 on which the printing is performable exists in the paper position after the paper transportation is stopped, the printing is partially carried out on the printable portion of the paper. Therefore, the override amount is recalculated and adjusted in the paper position when the paper transportation is stopped so that it is possible to judge whether some printable portion of the paper exists in the adjusted override area.

Figure 5:
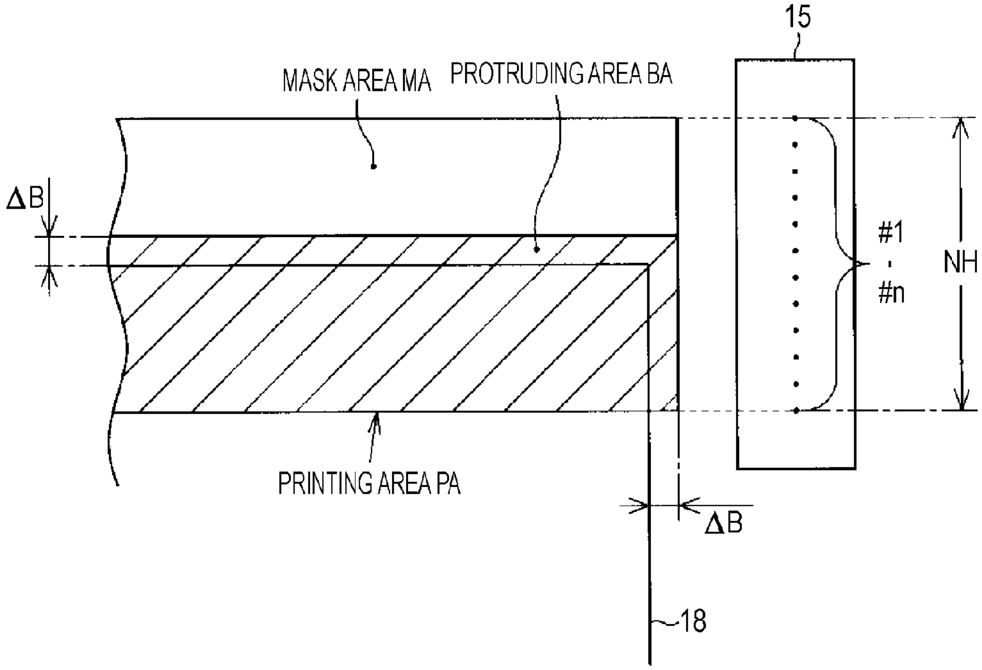
FIG. 5 is a schematic plan view for explaining mask processing after printing cancellation.

The override amount recalculation section 54 recalculates the override amount for the above-mentioned purpose. At this time, even if the setup of the printing condition is "marginal printing," the setup of "marginless printing" will always be adopted. FIG. 5 is a schematic side view for explaining the printing processing performed when a part of printing data can be printed after the stopping of the paper transportation in the platen printing prevention processing. As shown in FIG. 5, the range to the position which protrudes by a predetermined protrusion amount ΔB outward from the back end (lower side) of the paper 18 is assumed as a printing feasible area. The adjusted override amount SORrecal after the recalculation is calculated by adding the nozzle length NH equivalent to the paper transportation direction length of the range of the nozzles #1 to #n and the protrusion amount ΔB to the override amount SOR expressed by the distance from the back end of the paper 18 to the reference position (the uppermost stream nozzle location)($SORrecal=SOR+NH+\Delta B$). For example, the nozzle length NH is a value within the range from 10 to 50 cm, and the protrusion amount ΔB is a value within the range from 1 to 5 mm. The protrusion amount ΔB is the margin prepared so that marginless printing might be carried out certainly, even if the paper position varies somewhat.

The judgment section 55 judges whether it is in the override state by the judgment made on the basis of the adjusted override amount SORrecal after the recalculation by the override amount recalculation section 54. If the paper feeding remaining amount SRpf is larger than the adjusted override amount SORrecal ($SRpf>SORrecal$), "no paper state" in which the paper 18 (correctly printing feasible area) does not exist at all in the recording position of the recording head 15 as the back end of the paper 18 runs off the adjusted override area at the time of the stopping of the paper feeding. However, if the paper feed remaining amount SRpf is not larger than the adjusted override amount SORrecal ($SRpf\leqq SORrecal$), it is judged that the paper state falls into "override state" in which the back end of the paper 18 exists in the adjusted override area at the time of the stopping of the paper feeding and even some portion of the paper 18 (correctively, printing feasible area) does not exist in the recording position of the recording head 15.

When the judgment section 55 of the motor control unit 46 judges that the paper state is "override state (that is, a part of the recording data is printable)" by the judgment made on the basis of the adjusted override amount after the recalculation by the override amount recalculation section 54, the operation section 61 calculates the nozzle protrusion amount expressed by the protrusion length that is a length of nozzles disposed in a range from the back end of the paper 18 to a position protruding toward the downstream side of the paper transportation direction (upper side of FIG. 5) among the nozzles #1 to #n which have the nozzle length NH. The number M of nozzles which should be masked is calculated on the basis of the calculated nozzle projection amount. The number M of nozzles is the number of nozzles located in the mask area MA in FIG. 5.

The mask processing section 62 performs mask processing which carries out the mask of the original drive signal ODRV which should be applied to ejection drive elements corresponding to the nozzles #1 to #M which should masked. FIG. 6 is a block diagram showing the head drive circuit for driving every nozzle and the mask processing section. In addition, in FIG. 6, the number in a basket given to the last of each signal name shows a number of the nozzles to which the signal is supplied. In FIG. 6, the drive system for one row of nozzles is shown, and this drive system is prepared for every nozzle row.

The original drive signal generation section 65 shown in FIG. 6 generates the original drive signal ODRV used in common for all nozzles #1 to #n. This original drive signal ODRV is a signal containing two pulses, the first pulse W1 and the second pulse W2, as shown in the lower position of FIG. 6, within a movement period of a single unit area (within a time during which the carriage 14 travels to cross the single unit area). This generated original drive signal ODRV is outputted to each mask circuit 66.

The mask circuits 66 are prepared so as to correspond to a plurality of ejection drive elements which drive the nozzles #1 to #n of a recording head 15, respectively. Each mask circuit 66 is applied with a printing signal PRT (i) on the basis of the printing data as well as with the original drive signal ODRV from original drive signal generating section 65. The printing signal PRT (i) is single unit area data corresponding to a single unit of area, and is a serial signal consisting of 2 bits for each single unit area. The two bits correspond to the first pulses W1 and the second pulses W2, respectively. The mask circuit 66 intercepts or passes the original drive signal ODRV according to the level of the printing signal PRT (i). That is, when the printing signal PRT (i) is a low level, the original drive signal ODRV is intercepted so that ink drops are not ejected. Conversely, when the printing signal PRT (i) is a high level, the pulse corresponding to the original drive signal ODRV passes the mask circuit 66 so that the original drive signal is outputted to the ejection drive elements as the drive signals DRV (i). Thus, the nozzles #1 to #n can discharge ink drops.

In this embodiment, the mask circuits 66 are applied with mask processing signals SIG(1) to SIG(n) from the mask processing section 62, respectively in addition to the printing signals PRT(i). This mask processing signals SIG(1) to SIG(n) are signals each having 0 or 1 level and are signals used for mask processing which makes the printing data corresponding to the nozzles #1 to #M empty. Whether the drive signal DRV(i) becomes the signal which carries out the discharge of the ink drops after passing through out the mask circuit 66 is judged by the operation result of a logical product (AND operation) of the above-mentioned printing signal PRT (i) and the mask processing signal SIG. In addition, as shown in FIG. 4, the mask processing signals SIG(1) to SIG(n) of this embodiment are inputted into all nozzles #1 to #n, respectively. Therefore, it is possible to perform the mask processing for each nozzle on the basis of the mask processing signals SIG (1) to SIG (n). In addition, in this embodiment, a masking unit is constituted by the mask processing section 62 and the mask circuit 66.

As shown in FIG. 5, when a portion of the nozzles #1 to #n runs off the paper 18 in the position where the paper 18 is sent after the back end of the paper 18 is detected by the paper detection sensor 26, the printing cancellation is carried out first. Then, if the adjusted override amount SORrecal is extended by the amount of (nozzle length NH+protrusion amount ΔB) after the override amount recalculation, when the paper feeding remaining amount SRpf is smaller than the extended adjusted override amount SORrecal, printing to the paper 18 is possible by some nozzles among the nozzle #1 to #n. The operation section 61 calculates the number of nozzles which are in the printing feasible area. Namely, the nozzle protrusion amount ΔNZ can be acquired by subtracting the adjusted override amount SORrecal from the nozzle length NH (ΔNZ=NH−SORrecal). The value which is obtained by adding “1” to the value of the integer part of the numerical values acquired by dividing the nozzle protrusion amount ΔNZ by a nozzle pitch is considered as the number M of protruding nozzles M. The mask processing section 62 carries out the mask processing which masks the number M of protruding nozzles which include the uppermost stream nozzle #1 and nozzles disposed in a area to the reference position (the uppermost stream side nozzle location).

Next, operation of the printer 10 will be explained with reference to FIGS. 8 to 11D. FIG. 10 shows the flow of processing of the main control unit 41 and the sequence control unit 42, and particularly shows an example that printing cancellation was carried out especially during the paper transportation by the detection of the back end of the paper, but some nozzles can print on the paper 18 although the remaining nozzles run off the paper in the position where the paper feeding is stopped, that is, a part of the printing data is printable.

The CR-PF superposition control will be explained with reference to FIG. 10. The main control unit 41 sends a paper feeding demand and a printing demand by turns to the sequence control unit 42 according to the command contained in the printing data received from the host device 80 during the printing execution. The sequence control unit 42 performs the paper feeding operation and the printing operation according to each demand received from the main control unit 41.

When the paper feeding demand is received, the sequence control unit 42 will output a paper feeding instruction with the demanded paper feeding amount SApf to the PF motor drive circuit 43, and will perform the paper feeding operation. If the paper feeding operation is started at this time, the purport of the paper feeding starting will be answered to the main control unit 41. Then, the main control unit 41 sends the printing demand to the sequence control unit 42. The sequence control unit 42 performs the CR-PF superposition operation according to the printing demand in order to acquire the CR starting timing. After that, the sequence control unit 42 performs the printing operation at the CR starting timing. In this way, the CR-PF superposition control which starts the carriage 12 before the paper feeding operation stops is performed. If the carriage 12 arrives at a printing starting position, ink drops are ejected (fired) from the recording head 15, and the printing for one pass will be given to paper P. After the ink-drop ejection ends, the main control unit 41 is answered with the purport of successful printing. Next, when the sequence control unit 42 receives the next paper feeding demand, the sequence control unit 42 starts the paper feeding operation promptly after the ink-drop ejection even if the carriage 12 is in the middle traveling.

Figure 8:
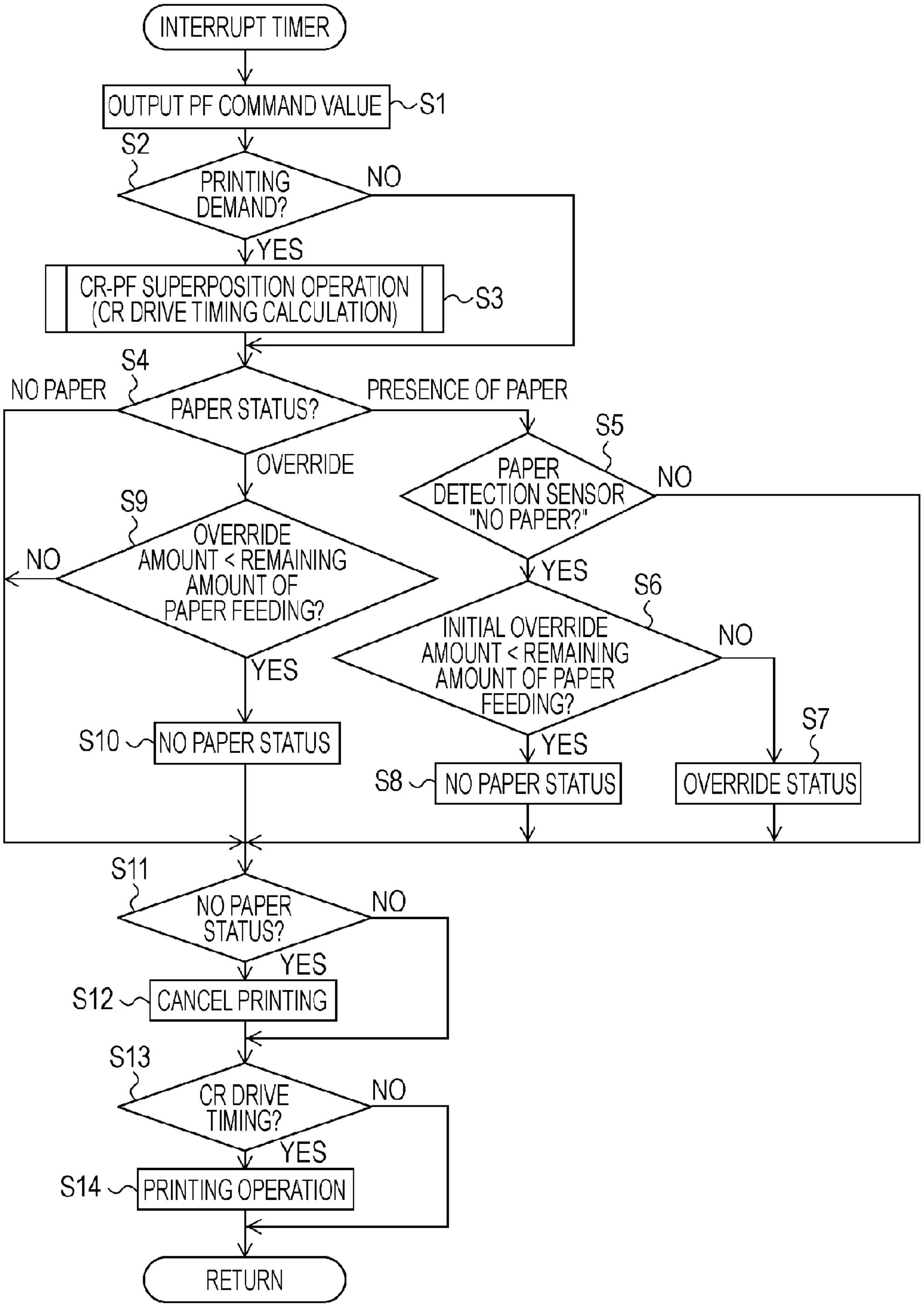
FIG. 8 is a flowchart illustrating timer interruption processing.

Next, processing operation of the sequence control unit 42 will be explained based on the flowchart of FIGS. 8 and 9. In addition, the transaction diagram of FIG. 10 is also referred to if needed. The sequence control unit 42 will execute the program shown in FIG. 8 by timer interruption, if the paper feeding demand is received. The paper feeding operation, the CR-PF superposition control, and the management of the paper state are performed by the execution of the timer interruption processing.

A PF instruction value is outputted at step S1. That is, a feedback operation (PID control operation in this example) of a paper feeding rate control is performed, and the paper feeding control is performed according to the calculated PF instruction value outputted to the PF motor drive circuit 43. With this PF instruction value outputted for every predetermined time interval by the timer interruption, the paper feeding operation is progressed with a predetermined speed profile.

At step S2, it is judged whether there was any printing demand. The control flow progresses to step S3 when there is no printing demand but to step S4 when there is the printing demand. At step S3, the CR-PF superposition operation (CR starting timing calculation) is performed. That is, the superposition operation section 51 computes the paper feeding amount STpf using the above-mentioned formula (4). However, this operation is not performed before receiving the printing data (raster data) of this pass since a printing starting position is not decided. Moreover, this operation is performed only once, when the printing demand is received.

In processing of steps S4 to S10, three paper states, “paper presence,” “override,” and “no paper” are managed. Hereinafter, the processing of steps S4 to S10 which perform the paper state management will be explained in detail. The monitoring section 52 stores the data about the paper state, for example, into a predetermined storage area of the memory 53, and manages the paper states. For example, “00,” “01,” and “10” are managed for “override,” “no paper,” and “paper presence,” respectively. The paper states managed by the monitoring section 52 are changed in order of “paper presence,” “override,” and “no paper” with the progress of the paper feeding.

At step S4, when it is judged first that the paper state is "paper presence," it is judged next whether paper detection sensor 26 switched from "paper presence" to "no paper" (S5). That is, it is judged whether the back end of the paper 18 was detected. In addition, "no paper" here indicates the detection state by the paper detection sensor 26 and thus the state "no paper" differs from "no paper state" of the paper state which means that paper does not exist in the printing position where the printing should be performed.

Accordingly, if the paper detection sensor 26 switches from "paper presence" to "no paper", it will be judged whether the paper feeding remaining amount SRpf is larger than the initial override amount SORint (SRpf>SORint) (S6). When SRpf>SORint is not satisfied, the paper state is set as the "override state" (S7). On the other hand, when SRpf>SORint is satisfied, the paper state is set as "no paper state" (S8). For example, when the paper 18 whose paper transportation direction length is shorter than a setup size is accidentally fed and the paper feeding is made in the demanded feeding amount longer than the initial override amount SORint, the back end of the paper 18 may be displaced from the override area to the downstream side of the paper transportation direction at the time of the stopping of the paper feeding. In such a case, since at least a part of nozzles #1 to #n protrudes from the area of the paper 18 and thus the platen printing is likely to occur, the paper state is set as "no paper state."

At step S11, it is judged whether the paper state is in "no paper state." If the paper state is in "no paper state," printing cancellation will be set up in step S12. That is, the motor control unit 46 (monitoring section 52) demands the printing control unit 47 for the printing cancellation. The printing control unit 47 which received this demand sets a printing cancellation flag. In addition, the processing of steps S1 to S8, S11, and S12 performed by the monitoring section 52 corresponds a first judgment step, and the monitoring section 52 which performs these processing corresponds to a first judgment unit.

At step S13, it is judged whether it became the CR starting timing. Namely, it is judged whether it became the CR starting timing by the condition in which the paper feeding remaining amount SRpf is not larger than the paper feeding amount STpf by comparing the paper feeding remaining amount SRpf which is obtained by subtracting a counting value (the amount of paper feeding to a current position) by the PF counter 56 from the paper feeding amount SApf of this time with the paper feeding amount STpf previously computed at step S3. If it became the CR starting timing, the printing operation will be performed in step S14.

Next, processing of the printing operation is explained with reference to the flowchart shown in FIG. 9. The carriage 12 is driven at step S21. At the following step S22, it is judged whether the printing is canceled. If the printing is not canceled, the control flow progresses to step S23 and the recording head 15 is driven. That is, when the counting value by the counter 63 which started to count simultaneously with the starting of the movement of the carriage 12 reaches the value corresponding to the printing starting position, the printing control unit 47 outputs the printing execution instruction to the head drive circuit 45, and makes the recording head 15 start ink-drop ejection (firing). As a result, a printing for this one pass is performed. On the other hand, if the printing is canceled, the control flow progresses to step S24, without outputting the printing execution instruction to the head drive circuit 45 (that is, while stopping printing by the recording head 15). In addition, the processing of steps S21, S22, and S23 performed by the sequence control unit 42 (control unit) is referred to as a first control, and these steps are referred to as a first control step.

Figure 7A:
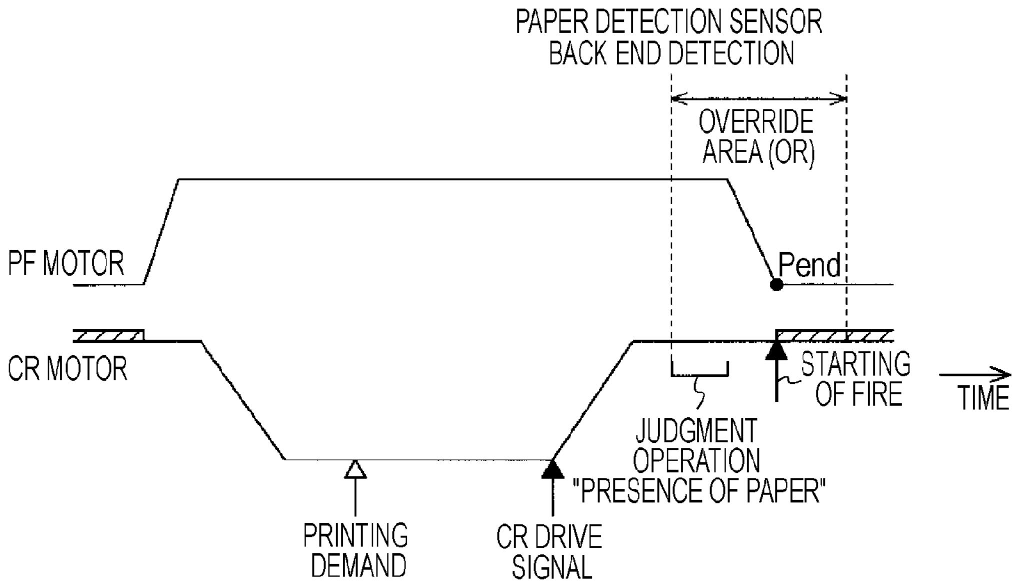
FIGS. 7A and 7B are graphs illustrating speed waveforms of the PF motor and the CR motor.
Figure 7B:
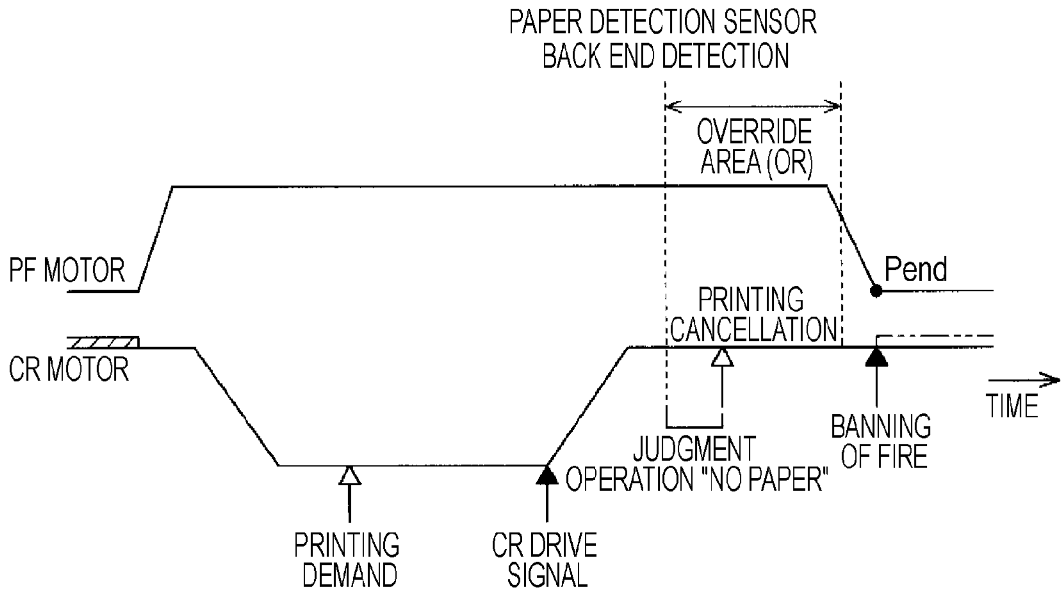

Here, as for the CR-PF superposition control, the control case where printing cancellation is carried out, and the control case where printing cancellation is not carried pit will be explained briefly. FIGS. 7A and 7B show the graphs illustrating speed waveforms of the PF motor 22 and the CR motor 13 at the time of back end detection of the paper. FIG. 7A shows an example in which the back end of the paper is present in the override area at the time of the stopping of the paper feeding and FIG. 7B shows an example in which the back end of the paper runs off the override area toward the downstream side of the paper transportation direction at the time of the stopping of the paper feeding.

As shown in FIGS. 7A and 7B, in the CR-PF superposition control, if the printing demand is received during the drive of the PF motor 22 (during the paper feeding), the CR starting timing will be calculated. When the calculated CR starting timing is reached, the CR starting signal will be outputted and the carriage 12 will start to move in the middle of the paper feeding. If the paper detection sensor 26 detects the back end of the paper during the paper feeding, the monitoring section 52 will judge the paper state.

For example, in the judgment of "override state" in which the back end position Pend of the paper 18 is in the override area OR at the time of the stopping of the paper feeding as shown in FIG. 7A, if the carriage 12 arrives at the printing starting position, the ink-drop ejection will be started (firing start). On the other hand, as shown in FIG. 7B, in the judgment of "no paper state" in which the back end position Pend of the paper 18 runs off the override area OR at the time of the stopping of the paper feeding, the printing cancellation is set up so that the platen printing should be prevented. For this reason, although the CR motor 13 is started with the output of the CR starting signal and the carriage 12 is started, the ink-drop ejection is stopped (firing prohibition). For this reason, the carriage 12 is in idle state (see FIG. 10 and FIG. 11C). In addition, when it is found that the printing cancellation should be carried out before the output of the CR starting signal, the starting of the PF motor 22 is stopped and the control which keeps the carriage 12 on idling is performed.

With this embodiment, when at least some portion of the paper 18 (specifically, printing feasible region of the paper, which is larger than the size of the paper 18 by the protrusion amount ΔB) exists in the position which face the nozzle #1 to #n and the printing to the paper 18 is possible, the printing is performed even if the printing cancellation is carried out for the platen printing prevention. For this reason, update processing of the values used for the judgment is performed so that the judgment whether the printing to the printing feasible region is possible for some portion of the nozzles #1 to #n at the time of the printing cancellation.

That is, at step S24, it is judged first whether the override amount recalculation is required. Once it performs the override amount recalculation for one sheet of paper 18, it is sufficient. That is, the recalculation is unnecessary if it is already done once for the same sheet of paper 18. The sequence control unit 42 refers the recalculation flag which is in ON state if the recalculation was done. If the flag is in OFF state, the sequence control part 42 will judge that the recalculation is required, and the control flow progresses to step S25.

The override amount is recalculated at step S25. The override amount recalculation section 54 performs the recalculation. Then, the adjusted override amount SORrecal is acquired by adding the sum of the nozzle length NH and the protrusion amount ΔB to the override amount SOR (the counting by the PF counter 56) (=SOR+NH+ΔB), and the counting value by the override counter 58 is updated with this calculation result. In this way, the override amount which is determined by the counting value of the override counter 58 is extended by the amount equivalent to the sum of the nozzle length NH and the protrusion amount ΔB). This is almost equal to the setup of the printing feasible region at the time of the setting up of the marginless printing with respect to the paper 18 of the present size, and the printing is performed if at least part of the printing feasible region exists in the position corresponding to locations of the nozzles #1 to #n. Even if "marginal printing" is set up in the layout of the printing conditions, the adjusted override amount SORrecal is set up in the same manner. The recalculation flag falls into ON state after the calculation of the adjusted override amount SORrecal.

In addition, in FIG. 10, it seems that "recalculation of the override amount," "judgment that the nozzles run off the paper but the printing is possible," and "calculation of the protrusion amount" are performed after answering the purport of the successful paper feeding, that is, after completion of the paper feeding. However, since these are processings performed after the starting of the carriage 12, these processings may be performed in the middle of the paper feeding and before the starting of the ink-drop ejection.

At step S26, although nozzles #1 to #n of the recording head 15 run off the paper 18, it is judged whether it is still printable. This judgment is made by the judgment section 55 in a manner such that the adjusted override amount SORrecal which is recalculated and the paper feeding remaining amount SRpf are compared with each other, and it is judged that it is printable when (SRpf≦SORrecal) is satisfied. This judgment step (S26) corresponds to a second judgment step, and a judgment section 55 which makes this judgment constitutes a second judgment unit.

The nozzle protrusion amount is calculated at step S27. That is, the number M of protruding nozzles which protrudes outward from the printing feasible area is calculated. The nozzle protrusion amount ΔNZ can be acquired by subtracting the adjusted override amount SORrecal from the nozzle length NH (ΔNZ=NH−SORrecal). The value which is acquired by adding "1" to the value of the integer part of the numerical values acquired by dividing the nozzle protrusion amount ΔNZ by a nozzle pitch is considered as the number M of protruding nozzles.

The paper state is changed into the "override state" at the following step S28, and the control flow progresses to printing restarting processing. When there is printing cancellation, as shown in FIG. 10, the sequence control unit 42 answers the main control unit 41 in the purport of printing failure. If the purport of printing failure is answered, the printing cancellation flag comes into OFF state. When the response of the purport of the printing failure is received, the main control unit 41 will resend the printing demand of the amount of the passes which were not printed. The sequence control unit 42 will print the passes which were not printed, when the printing demand is received.

Figure 9:
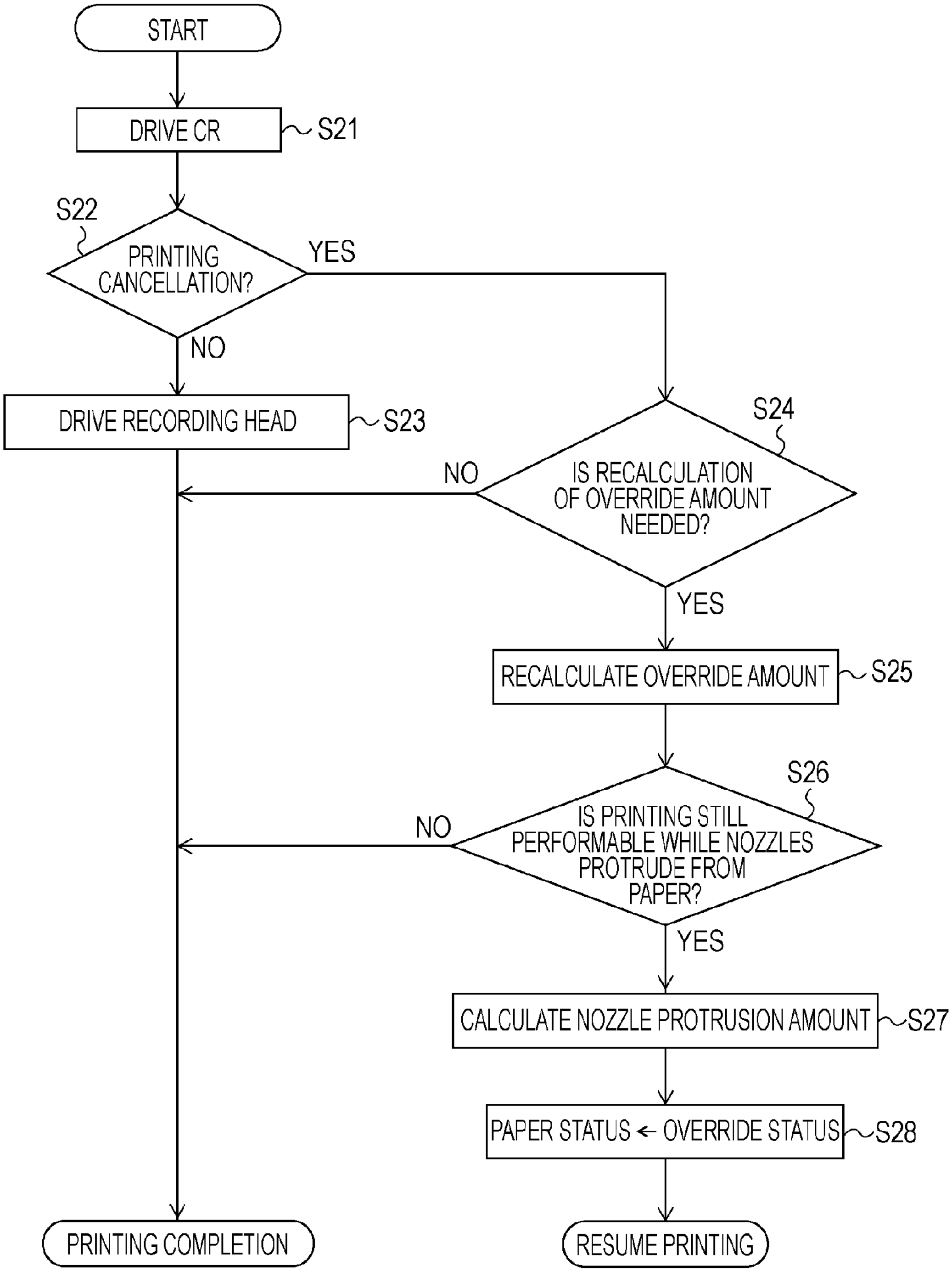
FIG. 9 is a flowchart illustrating printing operation processing.
Figure 10:
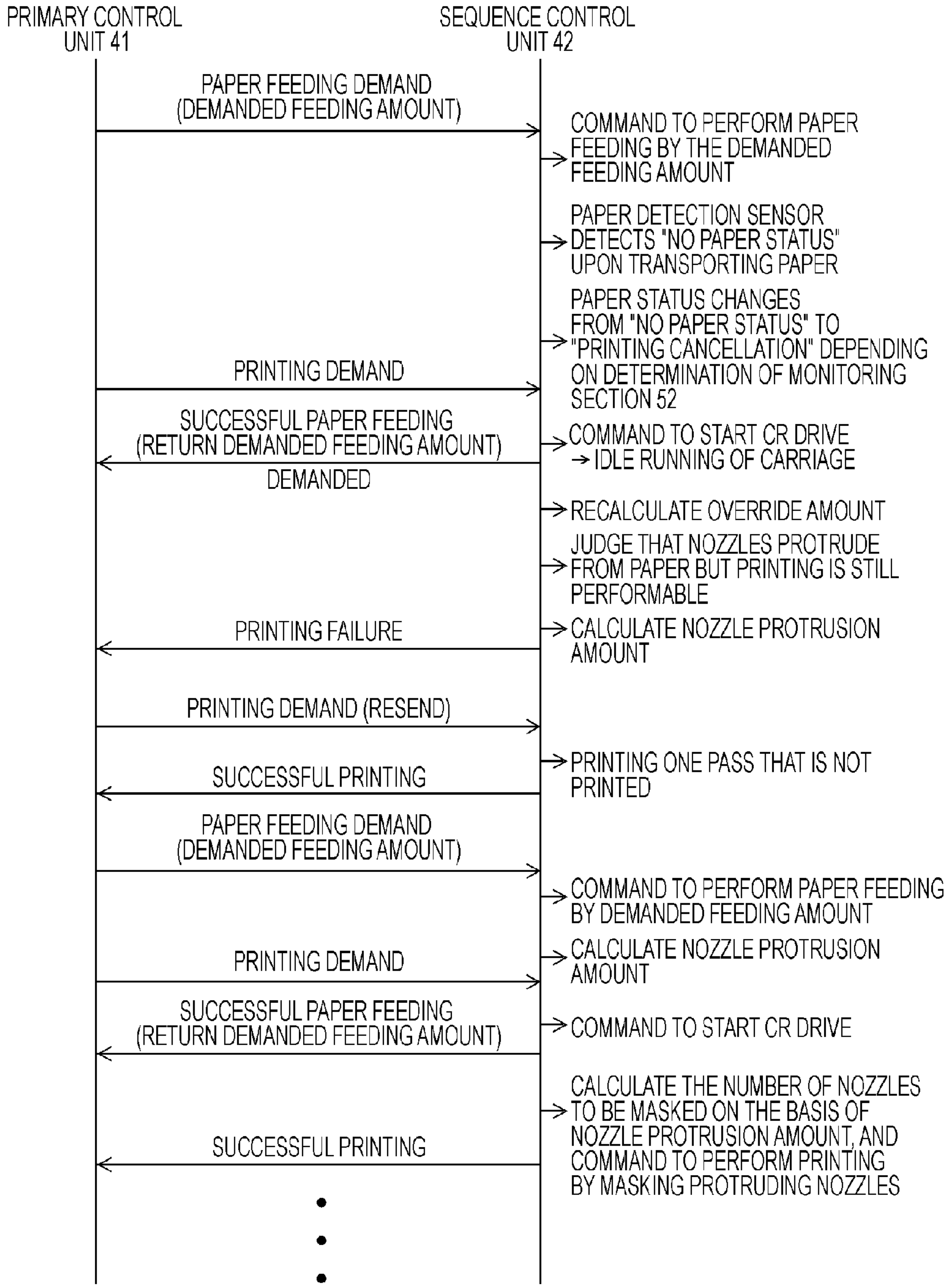
FIG. 10 is a transaction view for explaining processing for preventing platen printing from occurring.

That is, the sequence control unit 42 performs the processing of printing operation shown in FIG. 9 in the position of the present paper 18 and drives the CR (S21). Since there is not printing cancellation (NO: S22), the recording head 15 will be driven (S23) when the carriage 12 arrives at the printing starting position. At this time, the mask processing section 62 performs the mask processing which masks the M nozzles #1 to #M equivalent to the nozzle protrusion amount. That is, in FIG. 6, the mask processing section 62 sets the value of the mask processing signals SIG (1) to SIG (M) corresponding to the nozzles #1 to #M to "1" and the value of the mask processing signals SIG (M+1) to SIG (n) corresponding to the nozzles #M+1 to #n to "0", and then outputs the mask processing signals to the n mask circuits 66, respectively. As a result, even if the PRT(j) has 2-bit values "01", "10", and "11" other than "00" the original drive signals ODRV directed to the nozzles #1 to #M are intercepted by the mask circuits 66 among the original drive signals ODRV generated by the original drive signal generation section 65, and thus the drive of the injection drive elements corresponding to the nozzles #1 to #M in the recording head 15 is forbidden.

Figure 11A:
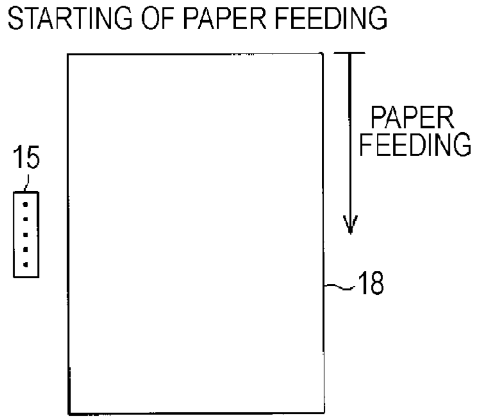
FIGS. 11A to 11D are schematic diagrams for explaining processing for preventing platen printing from occurring.
Figure 11B:
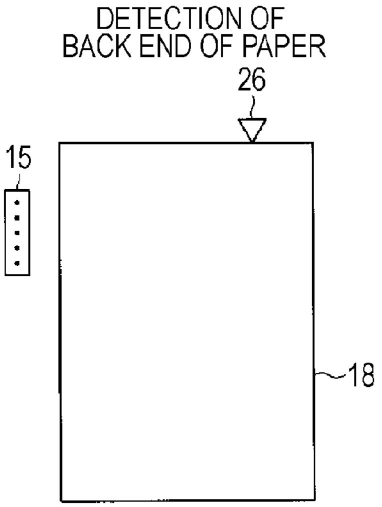
Figure 11C:
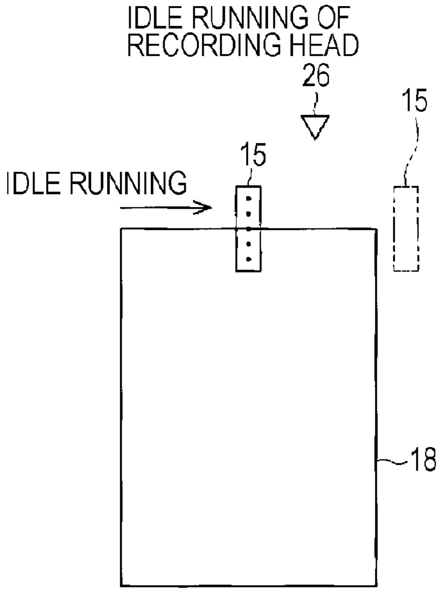
Figure 11D:
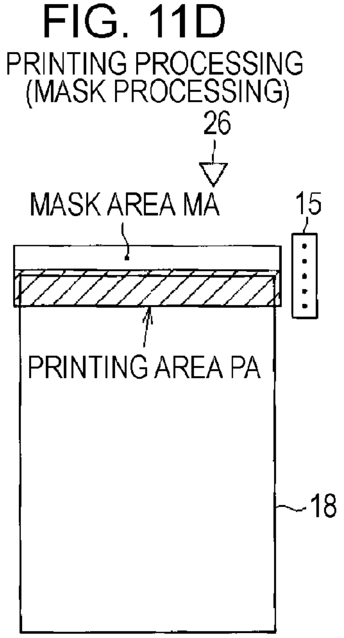

As a result, as shown in FIG. 5 and FIG. 11D, the nozzles #1 to #M are masked and ink-drop ejection is forbidden for those nozzles, but only the nozzles #M+1 to #n can perform the ink-drop ejection. For this reason, if the carriage 12 is driven, the ink drops are ejected from the nozzle #M+1 to #n, and the printing to the printing area PA is performed, but the printing to the area which is off the printing area PA is not performed. When the printing is completed, as shown in FIG. 10, the purport of successful printing will be answered. In addition, control of the above-mentioned steps S21, S22, and S23 which is performed by the sequence control unit 42 after the printing cancellation corresponds to a second control and a second control step.

Next, if the paper feeding demand is received, the sequence control unit 42 will perform the paper feeding by the demanded feeding amount (S1). If there is the printing demand (YES:S2), the CR-PF superposition operation is performed and the CR starting timing will be calculated (S3). Since the paper state is judged with "override state" (S4), when the override amount (the adjusted override amount SORrecal)<the paper feeding remaining amount SRpf is not satisfied by the judgment result of step S9 (NO:S9), the paper state is maintained as "override state" (NO:S11). Accordingly, the printing cancellation is not set. Since the judgment of step S9 is made using the adjusted override amount SORrecal, in the case in which this judgment condition is failure, it is judged that the nozzles protrude from the boundary of the paper but it is printable. If the judgment of "override state" is made when the recalculation flag is in ON state, the same nozzle protrusion amount as in step S27 is calculated. For this reason, the calculation of the nozzle protrusion amount is performed before the CR starting timing.

The printing operation will be performed (S14) when it becomes the CR starting timing (YES:S13). That is, when the carriage 12 arrives at the printing starting position after starting the carriage 12 (S21) by executing the printing operation processing shown in FIG. 9, the recording head 15 will be driven. By the driving of the recording head, the nozzles #1 to #M corresponding to the nozzle protrusion amount (the number of nozzles which protrude) which is previously calculated are masked. However, the number M of nozzles masked this time becomes larger than the number M of nozzles masked last time by the amount corresponding to the paper feeding amount. In this way, if the printing of at least the amount of 4 passes is repeated, the printing to the printing area PA shown in FIG. 5 by an interlacing recording system is finished. Since the nozzles #1 to #M which are disposed outside the printing feasible area are masked and thus the printing to platen 19 does not occur.

In this way, even if the printing to the paper 18 over a range on which the printing is possible is finished, since the paper feeding demand is continuously received from the main control unit 41, the paper feeding is performed once further. However, the paper state is switched to "no paper state" by the judgment of the paper state during this paper feeding. For this reason, the printing cancellation is carried out. When the printing cancellation is carried out while the recalculation flag is in ON state, the sequence control unit 42 answers the main control unit 41 with the purport of forceful termination of printing, and the printing is forcedly terminated.

For example, as shown in FIG. 11A, suppose that a user sets the paper 18 shorter than a setup length by mistake and performs printing, and the relatively long amount of the paper feeding is performed during the printing operation. If the paper detection sensor 26 detects the back end of the paper 18 during this paper feeding, the paper state at the time that the present paper feeding is stopped will be predicted. If the paper state is judged as "no paper state" in which the back end of the paper runs off the override area and the nozzles which are disposed outside the paper 18 exist, the printing cancellation is carried out by judging that the printing of the amount of a first number of nozzles on the basis of printing data is impossible. As a result, as shown in FIG. 11C, the printing is not performed even though the recording head 15 (carriage 12) moves. That is, the carriage 12 is idled. Accordingly, if the printing of the amount of a second number of nozzles, which is less than the first number, is possible although some nozzles are disposed outside the paper 18 (printing feasible area), an area (mask area MA) protruding from the printing feasible area is masked, and a printing area PA of the amount of the second number of nozzles which can be printable among the entire printing area undergoes the printing. Further, in this embodiment in which the printing is performed by the interlacing printing system, the first number of nozzles is the number of nozzles which are positioned at an interval of a predetermined integer multiple of the nozzle pitch and which should eject ink among the nozzles #1 to #n. The second number of nozzles is the number of nozzles which are not masked in the case in which the nozzles #1 to #M are masked among the nozzles which should eject ink drops.

As mentioned above, this embodiment has the following advantageous effects. (1) It is judged whether the back end of the paper 18 runs off the override area OR toward the downstream side of the paper transportation direction by using the detection of the back end of the paper 18 by the detection sensor 26 as a trigger, and the printing cancellation is carried out if the judgment result indicates that the back end of the paper runs off the override area OR. Then, the judgment is renewed after adjusting the override amount to be extended. At this time, if it is judged that some portion of the printing which is canceled is possible, the printing is partially performed while performing the mask processing with respect to some portion of the printing data other than the printable portion. For this reason, in the case in which the paper having a length which is shorter than the setup is fed by mistake, and the printing is performed, it is possible to partially print some portion of printing data which can be printable while avoiding the platen printing. For example, even if the printing is performed to the paper 18 which is shorter than the setup, since a range to the very back end of the paper 18 is printable, it likely happens that an intended part or most of the intended part of the printing data is printed and thus the necessity for reprinting will decrease.

(2) When the demanded feeding amount (specified length) of paper sending is performed after the detection of the back end of the paper 18, if it is judged that the printing of the amount of the first number of nozzles on the basis of the printing data is impossible, the demanded feeding amount of paper sending is continued but the scheduled printing of the amount of the first number of nozzles is terminated. For example, as compared with the structure in which the paper feeding is stopped when it is judged that the scheduled printing is impossible, when it is judged that the printing of the amount of the second number of nozzles, which is less than the first number, is possible, since the restarting of the paper feeding of the remaining paper feeding amount among the demanded feeding amount is not necessary, the printing can be started promptly.

(3) Even if the marginal printing is set up, it is judged whether a part of the printing data is printable under the condition which is regarded as a marginless printing setup with respect to the actual paper size. For this reason, when a part of the printing data can be printed in the paper position at the time of printing cancellation in the case of the marginal printing setup, the printing data can be printed to the paper over the range to the very end of the paper.

(4) When it is possible to judge the printing cancellation before the output of the CR starting signal, the output of the CR starting signal is suspended. For this reason, it is possible to avoid idling of the carriage 12 without stopping the output of the CR starting signal. As a result, the printing can be immediately started after the completion of processing for the part of the printing data which can be printed the next time, without waiting for the end of idling of the carriage 12. For this reason, the relatively high throughput of printing can be maintained.

(5) After the detection of the back end of the paper 18, the paper state is judged on the basis of the recalculated adjusted override amount SORrecal. For this reason, when paper shorter than the setup size is set, even if there is no printing cancellation at the time of detection of the back end of paper, since the paper state is judged on the basis of the adjusted override SORrecal, as long as there is an image which should be printed, the printing to the paper can be possible to the very end of the paper.

(6) In the next paper feeding operation after the paper back end detection, it is judged whether the condition that the paper feed remaining amount SRpf is larger than the adjusted override amount SORrecal (SRpf>SORrecal) is satisfied and is also judged whether the printing can be continued before the CR starting timing visits. For this reason, it is possible to judge whether partial printing is possible before the starting of the CR. For this reason, it is possible to start the printing of some portion of the printing data, which can be printed, immediately.

In addition, this embodiment is not limited to the above description but may be modified in the following manners.

Modification 1

The judgment of the first judgment unit may be made after the completion of the transportation. According to this structure, since it is possible to make a judgment in the exact position after the paper stops moving, it is possible to improve the accuracy of the printing point when the partial printing is possible. For this reason, it is possible to certainly print to the paper 18 over a range to the very end of the paper 18, avoiding the platen printing more certainly.

Modification 2

If the printing starting timing fits, some portion of the printing data whose printing is canceled but which is still printable according to the printing demand which is resent after the printing cancellation can be printed during the carriage movement which has been driven for the cancelled printing. According to this structure, it is possible to improve the printing throughput because it is possible to avoid idling of the carriage 12.

Modification 3

Instead of performing the mask processing, the printing data which should be printed is modified so that data corresponding to the mask area is removed from the printing data in the printer.

Modification 4

The judgment by the first judgment unit about whether the scheduled recording is possible is indirectly performed without viewing recording data by judging whether the recording of the maximum recording range (nozzles #1 to #n) is possible, and more specifically, whether the back end of paper is in the override area, but such judgment whether the scheduled recording is possible may be made directly while viewing the recording data. In this case, instead of the override amount SOR, whether the paper state is "override state" or "no paper state" is determined on the basis the value SROm (=SOR+NHm+ΔB) which is acquired by adding the nozzle length NHm which is equivalent to the length from the uppermost nozzle #1 to the nozzle #m which is the uppermost nozzle in the paper transportation direction among the nozzles that can eject ink drops on the basis of the printing data (recording data), and the protrusion amount ΔB to the override amount SOR. For example, if the paper feeding remaining amount SRpf is larger than the override amount SORm which is determined on the basis of the printing data at the time of printing (SRpf>SORm), the state is judged as "no paper state" in which the scheduled recording is impossible. Conversely, if the paper feeding remaining amount SRpf is not larger than the override amount SORm (SRpf≦SORm), the state is judged as "override state" in which the scheduled recording is possible.

Modification 5

The contents of operation which calculate the paper feeding amount STpf in the superposition processing can be changed suitably. For example, when the carriage is accelerated according to the curve-like acceleration profile, data of the acceleration time Tacc according to the curve-like profile are preliminarily stored in the memory 53, and the data is read from the memory and used for the operation. Moreover, when the data used for the operation are not measurement values, the operation may be performed by applying data correction which takes the change of the carriage weight into account to data of ink remaining amount managed by the printer 10.

Modification 6

The recording apparatus may be applied to an ink jet printer equipped with a full line head. That is, when the paper (recording medium) whose paper transportation direction length is shorter than a setup size is set and the back end of the paper is detected, since the transportation direction length of the paper is shorter than the setup size, the scheduled printing is suspended because it is judged that it is impossible to continue to perform the scheduled printing (recording) on the paper when the paper is transported to a position where the next printing should be performed. In the state in which the printing is suspended, if the scheduled printing is partially performable on the paper at the time when the paper is transported to a position where the next printing should be printed, some portion of the printing data except for a printable portion is masked, and the other portion of the printing data which can be printable is printed on the paper which is transported to the position where the next printing should be performed. In the case of a line printer, since the paper is transported at fixed speed and does not stop on the way, it is desirable that a time it takes for the paper to be transported to a scheduled printing position after the paper back end detection be set so as to allow the processing time which is needed in order to enable the printable part of the printing data to be printed after the scheduled printing is suspended to be secured. Moreover, even if the marginal printing is set up in this case, it is judged whether some portion of the printing data is also printable under the same condition as the marginless printing. For this reason, it is possible to print on the entire paper over the range to the very end of the paper.

Modification 7

As long as the adjusted override amount exceeds the original override amount, it may be set up with a proper value. For example, it may be extended by the nozzle length NH, it may be set as the distance to the lowermost nozzle location of the recording head 15, or it may be extended by the half of the nozzle length NH.

Modification 8

In the above-mentioned embodiment, an ink jet type printer is used as the recording apparatus, but the recording apparatus is not limited thereto. The recording apparatus can be also realized by a liquid ejection apparatus which ejects or discharges other fluid other than ink (for example, a liquid, a liquefied object in which particles of a functional material are dispersed in or mixed with a liquid, a liquefied object such as gel, and a solid which can be ejected as a fluid). For example, a liquefied object ejection apparatus which ejects a liquefied object which contains materials such as an electrode material and a color material (pixel material) in the form of distribution or the dissolution, which are used for manufacture of a liquid crystal display, an electroluminescence (EL) display, and a surface discharge display may be used. Further, the recording apparatus may be a liquid ejection apparatus which ejects the living body organic matter used for biochip manufacture, and a liquid ejection apparatus which ejects a liquid which serves as a sample and used as a precision pipette. Furthermore, examples of the recording apparatus may include a liquid injection apparatus which ejects lubricating oil as a pinpoint of precision instruments, such as a clock and a camera, a liquid injection apparatus which ejects transparent resin liquid, such as ultraviolet curing resin, on a substrate in order to form the fine hemisphere lens (optical lens) used for an optical-communications element etc., a liquid ejection apparatus which ejects etching solutions, such as acid or alkali, in order to etch a substrate, a liquid ejection apparatus which ejects a liquefied object such as a gel (for example, physical gel) and a particulate ejection apparatus (toner jet type recording apparatus) which ejects a solid such as powder (particulate). Further, the invention may be applied to either one kind of the liquid ejection apparatuses. In the specification, "fluid" is a concept which does not contain the fluid which consists only of gas, and the fluid contains a liquid (inorganic solvent, organic solvent, solution, liquefied resin, liquefied metal (metal melt) are included) a liquefied object, and a fluid-like object, a power object (a grain object and a granular material are included), etc. In this case, a recording medium may be a suitable media which is a target of the liquid ejection, such as a substrate. The invention may be applied to any one kind of recording apparatuses (liquid ejection apparatuses) among these.

The Hereafter, the technical idea grasped from the above-mentioned embodiment and modifications will be described.

(1) The above-mentioned recording apparatus is a recording apparatus defined in any of claims 1 to 8, and the recording apparatus is a serial type recording apparatus which is further equipped with a moving unit which moves the recording unit in a direction intersecting the transportation direction of the recording medium, and the control unit controls the recording unit, the moving unit, and the transporting unit so that the recording and the transportation are alternately performed, in which in the first judgment unit and the second judgment unit, the recording medium at the time of being transported to a position where the next recording should be performed is the recording medium at the time of the stopping of the transportation upon detection of the back end of the recording medium.

(2) The recording apparatus defined in any of claims 1 to 7, in which the second judgment unit makes the judgment without waiting for the stopping of the transportation.

What is claimed is:

1. A recording apparatus comprising:

a transporting unit which transports a recording medium;

a recording unit which performs a recording on the recording medium on the basis of recording data;

a control unit which controls the recording unit and the transporting unit;

a detection unit which detects a back end of the recording medium at a more upstream side of a transporting path than a recording position of the recording unit;

a first judgment unit which judges whether a scheduled recording is possible when the recording medium which is in the middle of transportation reaches a position where the recording should be performed when the detection unit detects the back end of the recording medium; and a second judgment unit which judges whether a portion of the scheduled recording to the recording medium is possible when the recording medium is transported to the position where the recording should be performed;

wherein the control unit continues to transport the recording medium even if the first judgment unit judges that the recording is impossible and performs a partial recording on the recording medium which is transported to the position where the recording should be performed if the second judgment unit judges that the partial recording is possible, wherein even in the case in which a marginal recording is set as a recording condition, the second judgment unit judges after the detecting unit detects a back end of the recording medium whether a portion of the scheduled recording would be possible if the marginal setting is changed to a marginless recording with respect to a real size of the recording medium detected by the detection unit, and wherein the control unit performs a portion of the scheduled recording in a marginless recording setting if it is determined by the second judgment unit to be possible.

2. The recording apparatus according to claim 1, wherein the second judgment unit makes the judgment after waiting for completion of the transportation.

3. The recording apparatus according to claim 1, further comprising a mask unit which masks a portion of recording data other than the portion of the recording data, which is recordable, among the entire recording data, wherein when the second judgment unit judges that the recording is partially performable, the control unit makes the recording unit perform a recording using the portion of the recording data which is not masked by the mask unit.

4. The recording apparatus according to claim 3, wherein the recording unit includes a plurality of nozzles which eject liquid and perform recording, wherein the recording apparatus further comprises a moving unit which moves the recording unit in a direction intersecting a recording medium transportation direction, wherein the control unit controls the transporting unit and the recording unit so that the transportation and the recording are alternately performed and also performs a superposition control so that movement of the recording unit and transportation of the transporting unit are overlapped in terms of time by driving the moving unit before the transporting unit stops driving, and wherein when the back end of the recording medium is detected, (1) if the first judgment unit judges that a recording corresponding to the amount of a first number of nozzles which corresponds to the recording data is possible in a condition that transportation of a specified length is performed, the scheduled recording of the amount of the first number of nozzles is performed, and (2) if the first judgment unit judges that the recording corresponding to the amount of the first number of nozzles is not possible and the second judgment unit judges that a recording of the amount of a number of nozzles, which is less than the first number, is possible, the transportation of the specified length is performed and a recording of the amount of a second number of nozzles, which is less than the first number, is performed by masking a portion of the recording data but the recording is not performed based on the superposition control.

5. The recording apparatus according to claim 4, wherein when the second judgment unit judges that the recording of the amount of a number of nozzles, which is less than the first number, is possible, if processing of changing the recording of the amount of the first number of nozzles to the recording of the amount of the second number of nozzles is completed before a recording starting timing of the superposition control, the recording of the amount of the second number of nozzles is performed during movement of the recording unit based on the superposition control.

6. A recording method in a recording apparatus including a transporting unit which transports a recording medium, a recording unit which records on the recording medium on the basis of recording data, a control unit which controls the recording unit and the transporting unit, and a detection unit which detects a back end of the recording unit at an upstream side of a transporting path from a recording position of the recording unit, the recording method comprising:

a first judgment step of judging whether a scheduled recording is possible when the recording medium reaches a position where a recording should be performed during transportation of the recording medium if the detection unit detects the back end of the recording medium which is in the middle of transportation;

a second judgment step of judging whether even a portion of the scheduled recording on the recording medium is possible when the recording medium is transported to a position where the recording should be performed; and a control step of continuing to transport the recording medium even if the first judgment steps judges that the recording is impossible and of performing a partial recording on the recording medium which is transported to a position where the recording should be performed if the second judgment steps judges that even a portion of the recording is possible;

wherein the second judgment step judges after the detecting unit detects a back end of the recording medium whether a portion of the scheduled recording would be possible if the marginal setting is changed to a marginless recording with respect to a real size of the recording medium detected by the detection unit, and wherein the control unit performs a portion of the scheduled recording in a marginless recording setting if it is determined by the second judgment unit to be possible.

7. A recording apparatus comprising:

a transporting unit which transports a recording medium;

a recording unit which performs a recording on the recording medium on the basis of recording data;

a control unit which controls the recording unit and the transporting unit;

a detection unit which detects a back end of the recording medium at a more upstream side of a transporting path than a recording position of the recording unit;

a first judgment unit which judges whether a scheduled recording is possible when the recording medium which is in the middle of transportation reaches a position where the recording should be performed when the detection unit detects the back end of the recording medium; and a second judgment unit which judges whether a portion of the scheduled recording to the recording medium is possible when the recording medium is transported to the position where the recording should be performed;

wherein the control unit continues to transport the recording medium even if the first judgment unit judges that the recording is impossible, creates partial recording data, and performs a partial recording on the recording medium based on the partial recording data, the recording medium being is transported to the position where the recording should be performed if the second judgment unit judges that the partial recording is possible without recording a portion of the recording data where recording is determined by the first judgment unit to be impossible.

8. The recording apparatus according to claim 7, further comprising a mask unit which masks a portion of recording data other than the portion of the recording data, which is recordable, among the entire recording data, wherein when the second judgment unit judges that the recording is partially performable, the control unit makes the recording unit perform a recording using the portion of the recording data which is not masked by the mask unit.

9. The recording apparatus according to claim 8, wherein the recording unit includes a plurality of nozzles which eject liquid and perform recording, wherein the recording apparatus further comprises a moving unit which moves the recording unit in a direction intersecting a recording medium transportation direction, wherein the control unit controls the transporting unit and the recording unit so that the transportation and the recording are alternately performed and also performs a superposition control so that movement of the recording unit and transportation of the transporting unit are overlapped in terms of time by driving the moving unit before the transporting unit stops driving, and wherein when the back end of the recording medium is detected, (1) if the first judgment unit judges that a recording corresponding to the amount of a first number of nozzles which corresponds to the recording data is possible in a condition that transportation of a specified length is performed, the scheduled recording of the amount of the first number of nozzles is performed, and (2) if the first judgment unit judges that the recording corresponding to the amount of the first number of nozzles is not possible and the second judgment unit judges that a recording of the amount of a number of nozzles, which is less than the first number, is possible, the transportation of the specified length is performed and a recording of the amount of a second number of nozzles, which is less than the first number, is performed by masking a portion of the recording data but the recording is not performed based on the superposition control.

10. The recording apparatus according to claim 9, wherein when the second judgment unit judges that the recording of the amount of a number of nozzles, which is less than the first number, is possible, if processing of changing the recording of the amount of the first number of nozzles to the recording of the amount of the second number of nozzles is completed before a recording starting timing of the superposition control, the recording of the amount of the second number of nozzles is performed during movement of the recording unit based on the superposition control.

* * * * *